(12) United States Patent
Bailey, Sr.

(10) Patent No.: US 7,985,268 B2
(45) Date of Patent: Jul. 26, 2011

(54) PARTICULATE WASTE PRODUCT GASIFICATION SYSTEM AND METHOD

(75) Inventor: Ron Bailey, Sr., Hot Springs, AR (US)

(73) Assignee: PRM Energy Systems, Inc., Hot Springs, AR (US)

( * ) Notice: Subject to any disclaimer, the term of this patent is extended or adjusted under 35 U.S.C. 154(b) by 304 days.

(21) Appl. No.: 11/264,553

(22) Filed: Nov. 1, 2005

(65) Prior Publication Data

US 2007/0094930 A1    May 3, 2007

(51) Int. Cl.
*C10L 3/00* (2006.01)

(52) U.S. Cl. .................................. 48/66; 48/61

(58) Field of Classification Search ............... 422/269, 422/271; 202/100
See application file for complete search history.

(56) References Cited

U.S. PATENT DOCUMENTS

| | | | |
|---|---|---|---|
| 3,411,465 A | | 11/1968 | Shirai |
| 3,671,167 A | | 6/1972 | Nakano |
| 3,865,053 A | * | 2/1975 | Kolze et al. ............... 110/186 |
| 3,905,757 A | * | 9/1975 | von Dreusche, Jr. ........ 432/18 |
| 4,011,059 A | * | 3/1977 | Daly et al. .................. 48/85.2 |
| 4,159,000 A | | 6/1979 | Iwasaki et al. |
| 4,308,806 A | | 1/1982 | Uemura et al. |
| 4,517,905 A | | 5/1985 | Chastain et al. |
| 4,549,886 A | * | 10/1985 | Stevenson .............. 48/197 R |
| 4,589,355 A | * | 5/1986 | Chastain et al. ............ 110/346 |
| 4,597,772 A | * | 7/1986 | Coffman .................... 48/111 |
| 4,718,358 A | | 1/1988 | Nomi et al. |
| 5,145,490 A | * | 9/1992 | Sadowski .............. 48/197 R |
| 5,264,009 A | * | 11/1993 | Khan ...................... 48/197 R |
| 5,607,487 A | * | 3/1997 | Taylor ....................... 48/111 |
| 5,632,211 A | | 5/1997 | Okuno et al. |

FOREIGN PATENT DOCUMENTS

| | | |
|---|---|---|
| DE | 2151136 | 5/1971 |
| EP | 0185931 A1 | 7/1986 |
| EP | 1030150 A1 | 8/2000 |

OTHER PUBLICATIONS

Machine translation of DE2151136—Dec. 14, 1972.
EPO Communication of Oct. 22, 2007 in EPO application No. 06 004 375.9-2301.
EPO Communication of Jun. 6, 2007 in EPO application No. 06 004 375.9-2301.

* cited by examiner

*Primary Examiner* — Alexa D Neckel
*Assistant Examiner* — Imran Akram
(74) *Attorney, Agent, or Firm* — J. Charles Dougherty

(57) ABSTRACT

Embodiments include a gasification process where the carbon content of the residue from gasification of agricultural waste products and the fly ash content of the gaseous exhaust is controlled by regulated inflow of gasification-supporting air in a plurality of flow stream at different velocities to enhance fluidization of particulate feed in a bed being raked by a rotating sweep arm inducing radially outward movement of gasification residue into a collecting zone from which the residue enters a discharge duct. The particulate feed is dropped at a location in the gasification chamber above the bed in alignment with the inflow stream of maximum velocity.

15 Claims, 7 Drawing Sheets

PARTICULATE WASTE PRODUCT GASIFICATION SYSTEM AND METHOD

BACKGROUND OF THE INVENTION

1. Field of the Invention

Embodiments of the present invention generally relate to a controlled gasification of agricultural waste products for utilization of the ash residue and gaseous exhaust.

2. Description of the Related Art

The disposal of waste or by-products from the processing of agricultural food crops often involves the burning of such by-products to create many problems for the food producing industry. By-products such as rice and peanut hulls, wood chips, cotton seed, etc. are tough, woody, and abrasive. Furthermore, such by-products are variable in density and have a high silica content. Incineration or combustion of such by-products is expensive, consumes large quantities of energy, and creates air pollution problems.

The controlled combustion or incineration of the foregoing type of waste or by-products or similar waste or by-products has heretofore been attempted with little success from either an economic standpoint or from an ecological standpoint. Because of feed density variation, overfiring or underfiring often occurs during combustion resulting in unstable heat generation and exhaust gas quality that is not satisfactory for heat recovery purposes. For example, the introduction of a feed with high silica content into the combustion chamber of a burner generates an exhaust stream with excessive fly ash, causing damage to and deterioration of boiler tubes because of silica related abrasiveness. Prior burners are also unable to control the degree of burn and therefore lack flexibility for control of the ash content of the combustion residue as a marketable product.

It is therefore an important object to provide an economical gasification system for a variety of feeds without requiring pretreatment or prior expensive processing and to accommodate a wide variation in feed bulk density.

Another object is to provide a gasification system for such waste products whereby the ash content of the combustion residue may be controlled and the fly ash content of its gaseous exhaust minimized.

A problem with typical combustion or gasification systems exists with respect to the accumulation of ash residue within the combustion or gasification system. The accumulation of the ash residue at non-discharging locations causes slagging, or hardening of the ash residue on the bed of the combustion or gasification system, due to overheating of the stagnant ash residue at the non-discharging locations. The gasification operation is often completely stopped (or at least slowed) by this build-up of ash residue at non-discharging locations. Thus, slagging of the ash residue is costly and time-consuming, as the operation of the gasification system must often be halted and personnel must be paid to remove the build-up of ash residue from the system. Furthermore, slagging of the ash residue is often costly because the parameters of the resulting ash residue product as well as the efficiency of the gasification system may be negatively impacted by the hardened build-up of the ash residue. The ash residue slagging problem is particularly acute when gasifying fuels having excessive amounts of potassium phosphates or low fusion temperatures, such as sewer sludge, distillery residues, sansa, straws, and other high alkaline fuels.

A further problem with currently utilized gasification systems involves the efficiency of the gasification process. The efficiency of the process is often compromised by the low temperature of the air within the gasification chamber. The efficiency and carbon conversion rate are often adversely affected by the air temperature and other variable operating parameters within the gasification system.

Yet a further challenge with the typical gasification system relates to the residence time of the fuel within the gasification chamber. The typical gasification system is only capable of gasifying a fixed quantity of fuel within the chamber at a time because of the fixed volume of the gasification chamber. Increasing the speed of the existing agitator arm to gasify more fuel per period of time causes the contents of the gasification chamber to become more volatile and as a result causes fuel or ash to entrain into the gas stream. Additionally, even when the gasification system is operated at the desired agitator arm speed, fuel or ash often entrains into the gas stream.

Also problematic with the current gasification systems is the bowing of the agitator arm. When the agitator arm within the gasification chamber is overheated, the agitator arm tends to bow upward and downward relative to the gasification chamber, compromising the efficiency and performance of the gasification system.

There is therefore a need for a gasification system where slagging of the ash residue at non-discharging locations within the gasification chamber is better controlled.

There is a further need for a gasification system with increased efficiency and greater carbon conversion as compared to currently utilized gasification or combustion systems.

Moreover, there is a need for a gasification system which is capable of maintaining the residence time of the fuel present in prior gasification systems even when slowing down the agitator arm to prevent entrainment of the fuel or ash into the gas stream. There is a further need for a gasification system which is capable of processing more fuel in a given time period without entrainment of the fuel or ash into the gas stream.

Finally, there is a need for a gasification system which reduces or eliminates possible damage to the agitator arm.

SUMMARY OF THE INVENTION

It is therefore an object of embodiments of the present invention to provide an improved gasification system with increased efficiency and carbon conversion rates.

It is a further object of embodiments of the present invention to provide a gasification system which decreases or prevents slagging of the ash residue within the gasification system.

It is yet a further object of embodiments of the present invention to provide a gasification system which enhances the flexibility of the gasification process.

It is an additional object of embodiments of the present invention to provide a gasification system where the agitator arm rotation speed may be slowed down while maintaining the residence time of the fuel.

It is a further object of embodiments of the present invention to provide a gasification system where the residence time of the fuel in the gasification chamber may be maintained, increased, or decreased without causing entrainment of the fuel/ash into the gas stream.

An additional object of embodiments of the present invention is to provide a gasification system which reduces or eliminates the bowing of the agitator arm within the gasification chamber.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
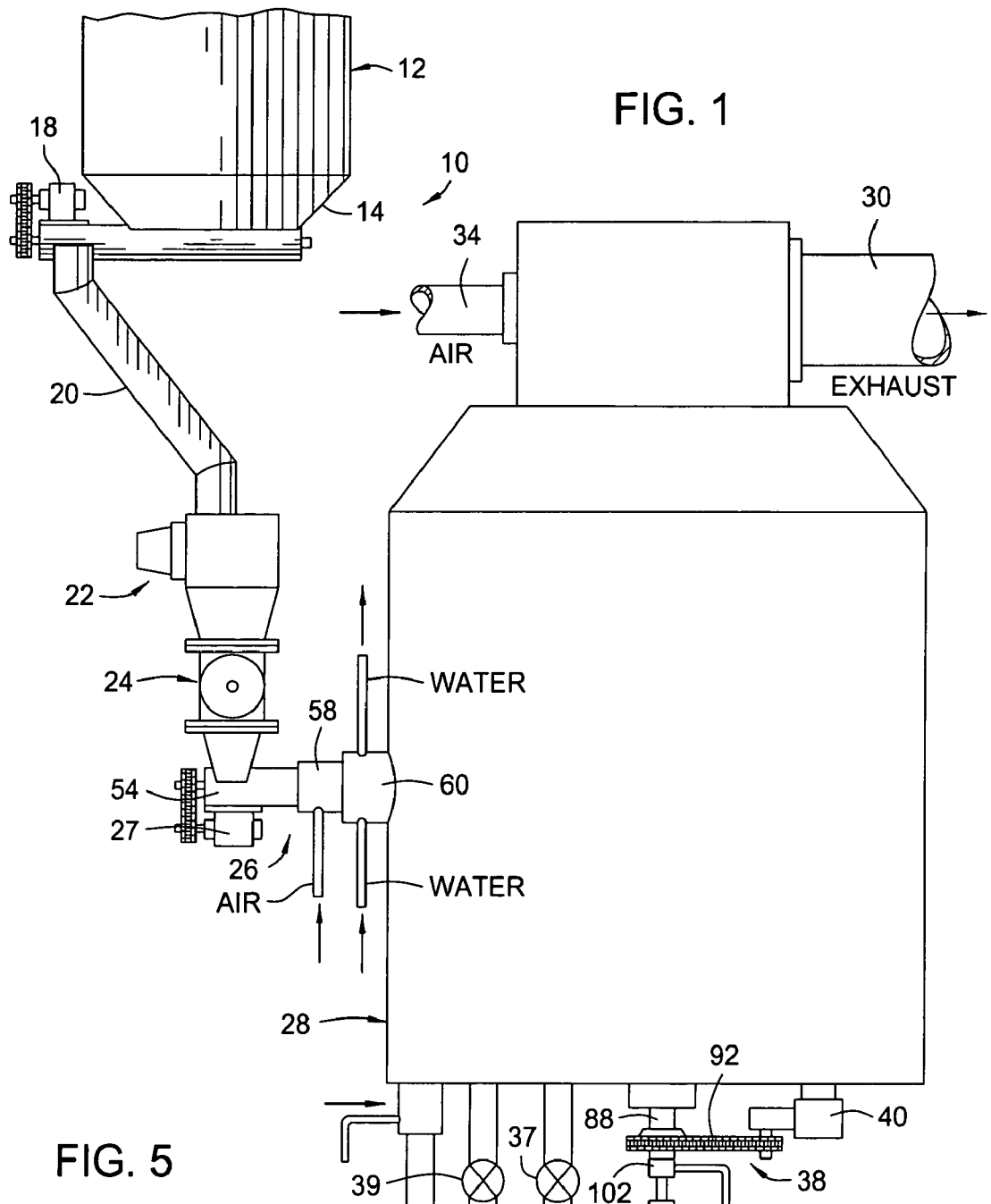
FIG. 1 is a simplified side elevational view of the apparatus associated with the system of the present invention.
Figure 5:
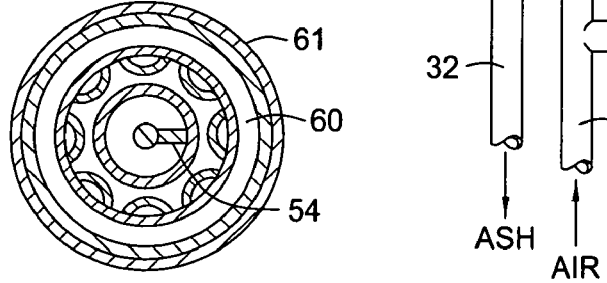
FIG. 5 is a partial transverse section view taken substantially through a plane indicated by section line 5-5 in FIG. 2.

Gasification converts a carbon-containing material into a synthesis gas composed primarily of carbon monoxide and hydrogen, which may be utilized, for example, as a fuel to generate electricity or steam or used as a basic chemical building block in the petrochemical or refining industries. Advantageously, gasification often adds value to low-value or value-less feedstocks by converting them to marketable fuels and products.

In the gasification system, limited combustion of volatiles in the fuel occurs to supply heat for the gasification process. When the conversion of solid fuel to gases occurs, the gases may then, for example, either be combusted in stages for firing boilers, dryers, kilns, or furnaces; cooled and cleaned for firing internal combustion engines; or further processed into liquid fuels.

The gasification process significantly minimizes the production of potentially harmful pollutants because total burning or oxidation preferably does not occur in the gasifier due to lack of sufficient oxygen therein. A burnable gas is released upon "composting" of the biomass material. The produced gas is then combusted in stages at precise temperatures to minimize or reduce the production of harmful pollutants. Because of this process, gasification is often preferable over incineration of waste, where all oxidation or combustion takes place in a single chamber and rapidly.

U.S. Pat. Nos. 4,589,355 and 4,517,905 are incorporated by reference herein in their entirety. In accordance with the present invention, a particulate feed is fed into a gasification chamber at a regulated feed rate and mixed with air when discharged from a temperature-cooled end portion of a stock feeding system at a central infeed location within the gasification chamber above a bed into which the particulate feed drops. Gasification-supporting air is supplied to the gasification chamber at an overfire location above and from underfire location below the bed. Underfire axial inflows of air enter the gasification chamber through grate openings at velocities insufficient to fluidize the particulate material while undergoing gasification in the absence of a mechanical raking action. A water-cooled radial sweep arm is rotated just above the bed support to rake and agitate the particulate solids through the fluidizing zone of the gasification chamber at a speed sufficient to mechanically fluidize the solids during gasification. The sweep arm is preferably vertically adjustable to a height spaced above the fixed bed support to accommodate different types of particulate feed, from heavy density rice hulls to light density cottonseed. The raking action of the sweep arm also induces radially outward movement of the particulate feed under centrifugal force toward a non-fluidized collection zone above an imperforate peripheral portion of the bed support. A residue discharge duct is connected to the imperforate portion of the bed support at one or more locations within the collection zone, and a material displacing paddle is connected to the radially outer end of the sweep arm for rotation therewith to displace the ash residue from the collection zone into the residue discharge duct.

Operation of the foregoing apparatus evolves a gaseous exhaust that flows past the infeed location to an upper exhaust duct, which delivers an exhaust useful as a heating medium for boilers or the like. By control of the feed rate of the particulate feed and adjustment of the vertical spacing of the sweep arm above the bed support, the heat energy content of the exhaust may be varied to meet different requirements. Furthermore, the carbon content of the ash residue may be varied by adjustment of underfire air inflow rates between limits and adjustment of the variable speed sweep arm, in order to meet different market requirements for disposal of the ash residue.

Underfire air inflow is conducted through the porous portion of the fixed bed support from at least two flow streams separated by a circular partition within an inflow compartment underlying the bed support. The inflow velocities of the two flow streams are selected at different levels through separate air valves so that the radially inner air inflow zone aligned below the infeed location conducts an upward inflow stream at a higher velocity than that in the other inflow zone.

Referring now to the drawings in detail, FIG. 1 illustrates typical apparatus for practicing the system of the present invention, generally referred to by reference numeral 10. A solid waste product is stored in a stock hopper 12 having a lower unloading end portion 14 from which particulate feed material enters an auger conveyor 16 attached to the hopper. The conveyor 16 is driven by a driving mechanism, preferably a variable speed motor 18 to deliver the feed to the upper inlet end of a gravity duct 20 of generally rectangular cross-section. The lower delivery end of the duct 20 is connected to the housing of a flow meter 22 through which the feed passes into a rotary type of metering device 24. The flow meter 22 may be of a commercially available impact line type designed to measure the weight flow rate of the feed and generate an electrical signal reflecting such measurement. The signal output of the flow meter 22 may be accordingly used to control drive of the variable speed motor 18 in order to maintain a substantially constant weight flow feed rate for the infeed mechanism 26. The rotary metering device 24 is well known in the art and is utilized herein to prevent gas back-up.

The infeed mechanism 26 is driven by a driving mechanism, preferably variable speed motor 27, and extends into gasification chamber device 28. The products of gasification include a gaseous exhaust discharged through an exhaust duct 30 from the upper end of the gasification chamber device and an ash residue withdrawn through a duct 32 from the lower end. Gasification-supporting air is supplied through an overfire inflow duct 34 at the upper end and an underfire inflow duct 36 at the lower end. The underfire inflow is preferably split between two inflow paths by inflow-controlling air valves 37 and 39 through which air enters device 28, preferably at two different velocities. A feed raking mechanism 38 is associated with the device 28 and extends from its lower end for drive by a driving mechanism, preferably a variable speed motor 40. The mechanism 38 is preferably vertically adjustable through any suitable power operated adjusting device 41 from which a piston adjustment rod 43 extends.

Figure 6:
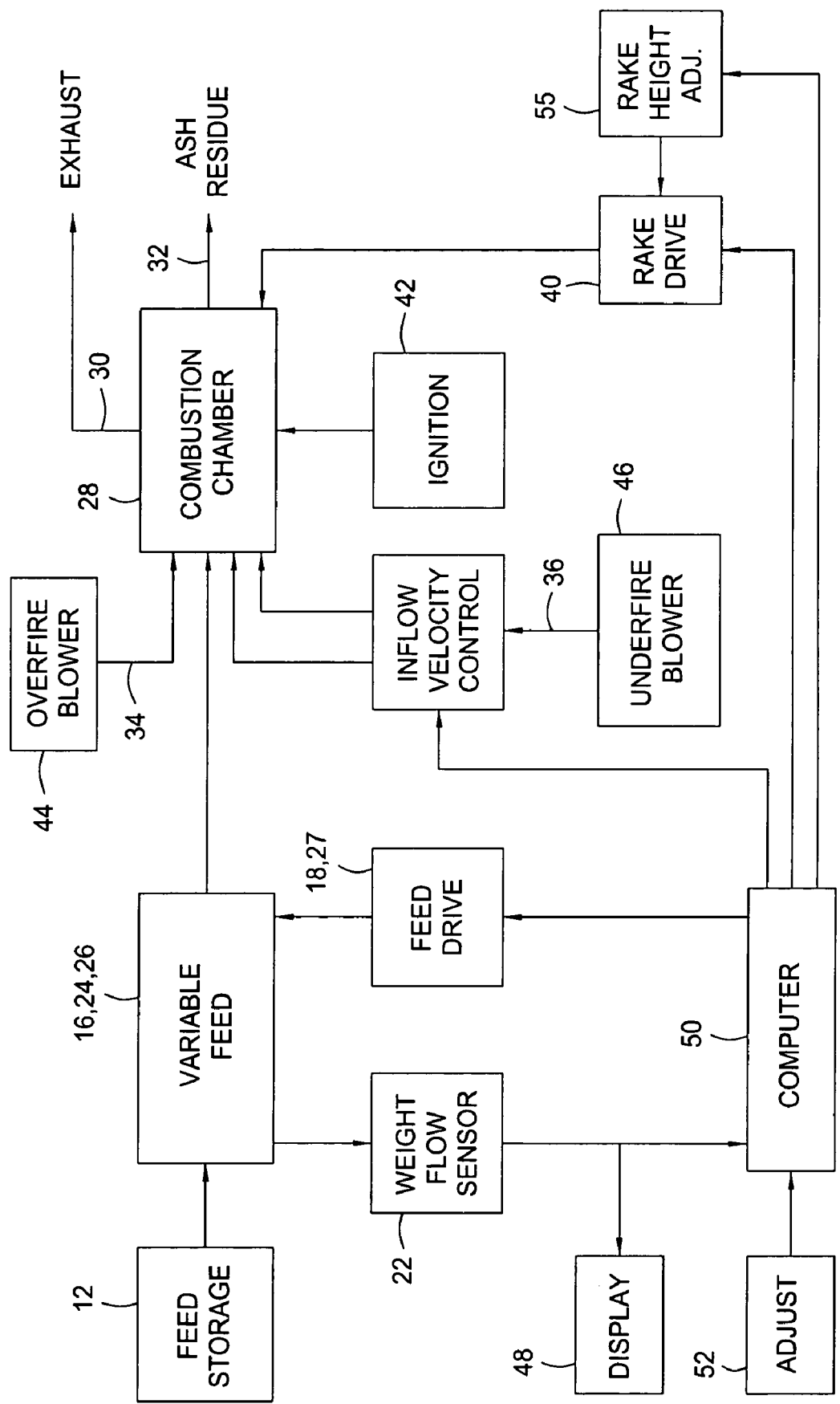
FIG. 6 is a block diagram schematically illustrating the system of the present invention in association with its controls.

The system with which apparatus 10 is associated is diagrammed in FIG. 6, showing the flow of the particulate feed from storage 12 to the gasification chamber device 28 with which some form of igniting device 42 is associated. Also associated with gasification chamber device 28 are the rake drive motor 40 aforementioned and blowers 44 and 46 for respectively supplying air through the overfire and underfire inflow ducts 34 and 36. The signal output of the flow meter 22 is preferably fed to a visual display 48 and as an input to a computer 50 to which adjustment input data is also fed from 52. The computer produces outputs for control of the feed drives 18-26 in order to maintain an adjusted uniform weight flow rate for the feed into the gasification chamber. Underfire inflow velocities from blower 46, the vertical spacing of the sweep arm, and its rotational speed may also be controlled by the computer through valve control 53, motor 40, and rake height adjustment control 55. The computer, if utilized, is thus programmed to control the feed rate, inflow velocities of the underfire air, and the height and speed of the rake in accordance with embodiments of the present invention.

Figure 2:
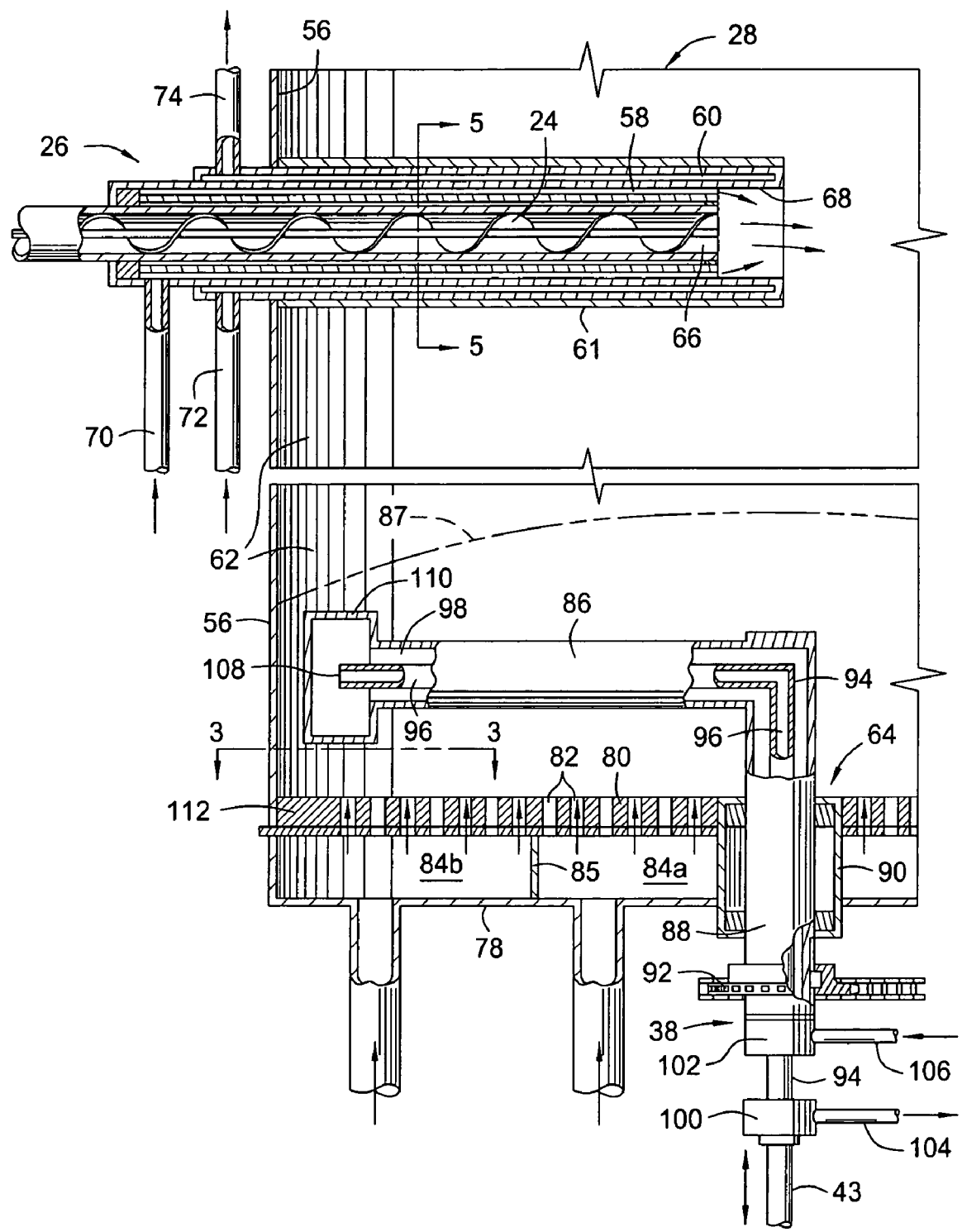
FIG. 2 is an enlarged partial side sectional view of the apparatus shown in FIG. 1.

Referring now to FIGS. 1 and 2, the infeed mechanism 26 includes an auger-type conveyor 54 driven by the motor 27 externally of the housing 56 of the gasification chamber device 28. The conveyor 54 is enclosed by air passages 58 and an outer water jacket 60 that extend into the housing 56 with the conveyor 54 to cool the conveyor within the high-temperature environment of the gasification chamber 62 enclosed by housing 56 above a fixed, horizontal bed support 64. An insulating coating 61 is preferably formed on the outer watercooling jacket 60, which extends axially beyond the discharge end 66 of the auger conveyor 54 to form a mixing space 68 at a central infeed location within the gasification chamber substantially aligned with the vertical longitudinal axis of the housing 56. The cooling air passages 58 open into the mixing space 68 so that air supplied thereto externally of the housing by conduit 70 will discharge into space 68 for mixing with the particulate feed being discharged from the delivery end 66 of the conveyor 54. The annular water space of jacket 60 is closed at its inner end for circulation of water between inlet and outlet conduits 72 and 74. Thus, air and water cooling of the conveyor 54 enables it to function continuously in discharging a mixture of air and particulate solids at a relatively hot central location in a thermal upflow of gaseous gasification products for decelerated gravitational descent toward the bed support 64. The space 68 not only provides for mixing of the particles with air before drop onto the bed, but also prevents back-firing into the auger conveyor 54 and clears the discharge end thereof by the continued outflow of air from passages 58 when feed from the conveyor 54 is interrupted.

The bed support 64, as shown in FIG. 2, includes a steel gas distributor plate 76 spaced above the bottom wall 78 of the housing 56 and a refractory plate 80 fixed to the steel plate. A major radially inner porous portion of the plate 76 has one or more openings therein, preferably one or more closely-spaced openings 82, to form a burner grate above an underfire compartment divided into two radially spaced inflow zones 84a and 84b to which the underfire air is conducted through the air valves 37 and 39 as aforementioned. Accordingly, the blower-pressurized underfire air is preferably directed upwardly through the grate openings 82 under different velocities from two flow streams separated by a circular partition 85.

The particulates which form the bed, as shown by dotted line 87 in FIG. 2, are mechanically fluidized during gasification by the rake mechanism 38 which includes a radial sweep arm 86 extending through the fluidized zone from a rotor portion 88 supported by a sealed bearing assembly 90 for rotation about the vertical axis of the housing. The sweep arm may be adjustably spaced above the plate 76. The rotor 88 has a gear 92 splined thereto, preferably externally of the housing, for driving connection to the motor 40. A conduit 94 extends concentrically through the rotor 88 and sweep arm 86 to form an inner return flow passage 96 and an annular inflow passage 98, respectively, connected through fixed manifolds 100 and 102 to coolant outlet and inlet conduits 104 and 106. The end 108 of inner conduit 94 opens into a hollow paddle formation 110 connected to the radially outer end of the sweep arm 86. The interior of the paddle is preferably in communication with the annular passage 98 so that water will circulate through the sweep arm and paddle for cooling thereof.

Figure 4:
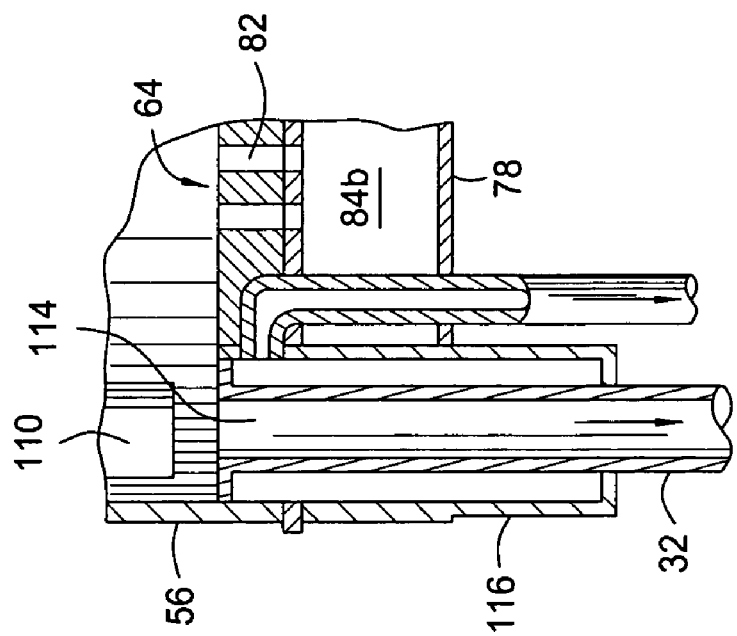
FIG. 4 is an enlarged partial section view taken substantially through a plane indicated by section line 4-4 in FIG. 3.
Figure 3:
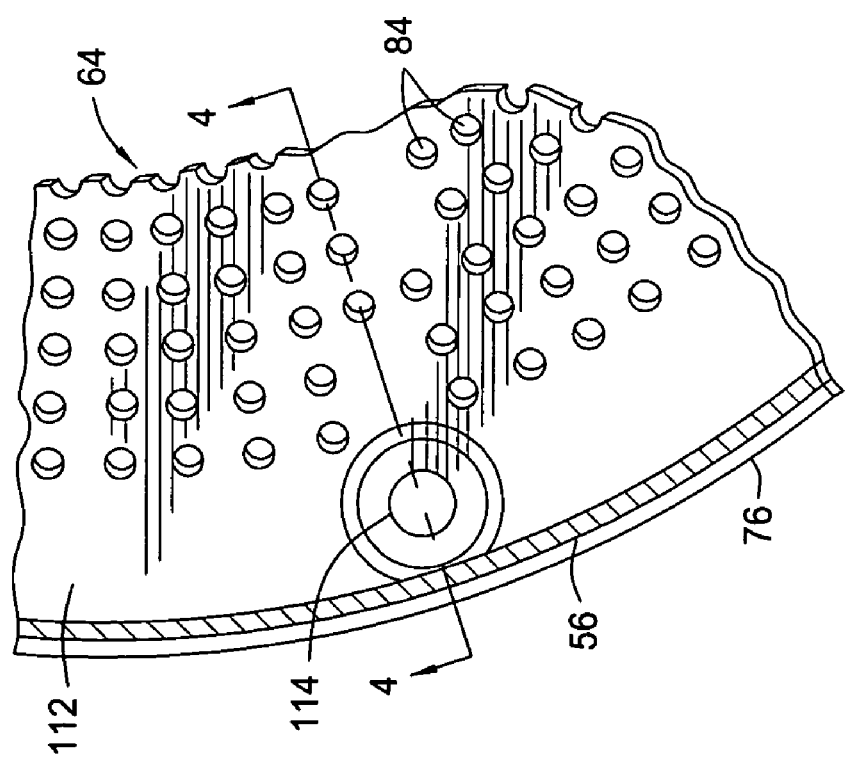
FIG. 3 is a partial section view taken substantially through a plane indicated by section line 3-3 in FIG. 2.

The paddle 110 is vertically spaced above a radially outer, imperforate portion 112 of the bed support 64 over which a non-fluidized collection zone is established. It will be apparent that rotation of the sweep arm through the rotor portion 88 of the mechanism 38 not only fluidizes material during gasification, but also induces radially outward movement thereof under centrifugal forces toward the non-fluidized collection zone above the annular imperforate portion 112 of the bed support. Thus, an ash residue is collected on portion 112 of the bed support and is displaced by the paddle 110 each revolution to the upper inlet end 114 of the residue discharge duct 32, as more clearly seen in FIGS. 3 and 4. As shown in FIG. 4, a water-cooling jacket 116 is mounted about the duct 32, which is connected at its upper inlet end to the imperforate portion 112 of the bed support 64. The inlet end 114 is furthermore aligned with the paddle which cyclically passes thereabove to effect withdrawal of the ash residue collected on the portion 112 of the bed support.

As a result of the arrangement of the apparatus hereinbefore described, the fly ash content and abrasiveness of the exhaust gas is minimal despite the use of a feed having a high silica content. The fly ash content of the exhaust gas is furthermore reduced by a lower velocity of the underfire inflow through the radially outer zone 84b aligned below the radially outer portion of the bed 87, which is thinned out by the raking action. The central portion of the bed 87, preferably of maximum height because of its alignment with the central infeed location, is aligned with the radially inner inflow zone 84a through which inflow air enters at a higher velocity. Because of the foregoing zoning of the underfire air, a fly ash reducing affect is realized which is particularly critical in accommodating the gasification of lightweight feeds such as cottonseed.

To accommodate heavier feeds such as rice hulls, the rake speed of the sweep arm and the height of the sweep arm above the plate 76 may be increased toward upper operational limits of 7.5 RPM and 13½ inches, respectively, for efficient gasification. For the lighter feeds, such as cottonseed, sweep arm height is preferably lowered toward a lower limit of 5½ inches according to actual embodiments of the invention. Also, for lighter feeds, dimensional increases in width and height of the sweep arm paddle 110 were found to be beneficial in enhancing the recovery of the ash residue. Variations in the aforementioned parameters, including sweep arm height and speed, paddle size, and underfire inflow zone velocities, also affect the carbon content of the ash residue in different ways which may thereby be tailored to meet different combinations of product requirements and feed characteristics.

Figure 7:
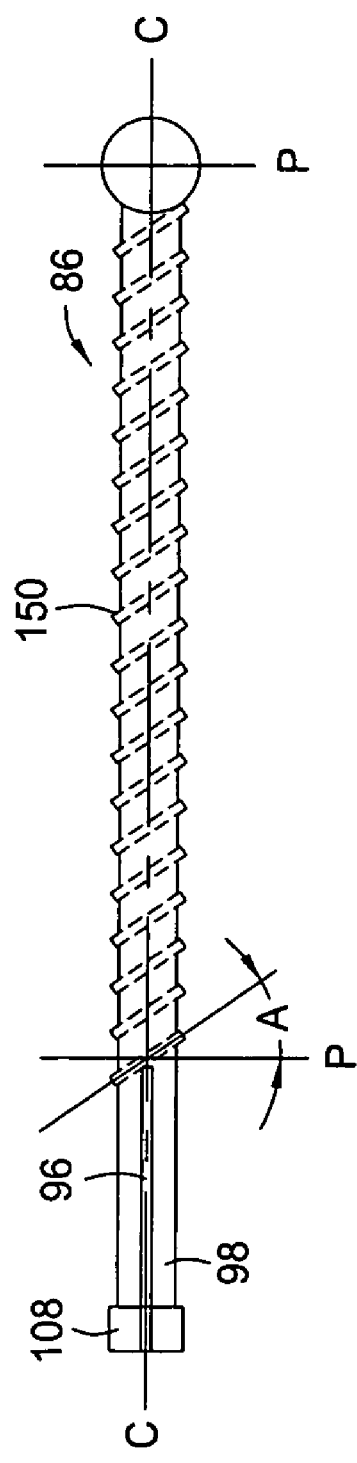
FIG. 7 is a side elevational view of an agitator arm usable with the apparatus of FIGS. 1 and 2.
Figure 8:
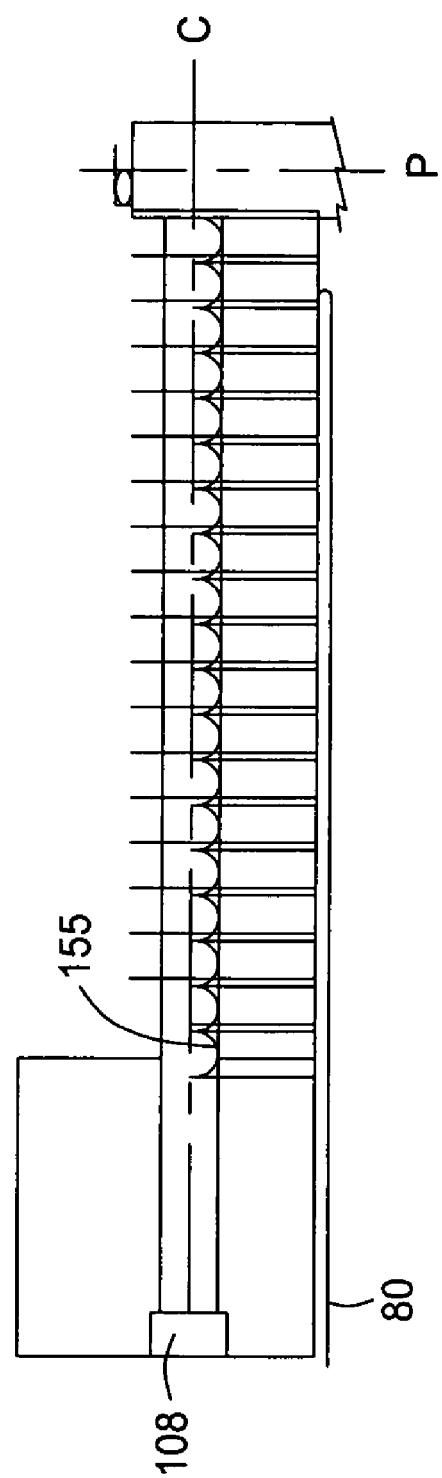
FIG. 8 is a partial section view of the agitator arm of FIG. 7.
Figure 9:
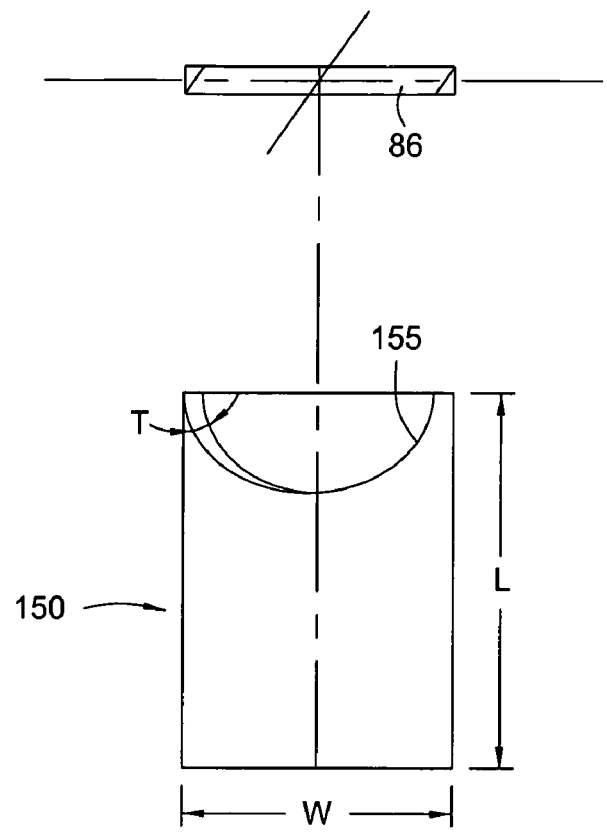
FIG. 9 is an exploded view of an agitator blade usable with the agitator arm of FIGS. 7 and 8.

In an alternate embodiment shown in FIGS. 7-9, the radial sweep arm 86 or agitator arm may include one or more blades 150 or deflectors thereon to further encourage the ash residue within the gasification chamber device 28 towards the outer perimeter of the bed support 64 (and toward the upper inlet end 114 of the residue discharge duct 32). The blades 150 help to prevent slagging of the fuel on the bed support 64 by urging the fuel towards the outer perimeter of the bed support 64, thereby increasing efficiency of the process and preventing the halting of the process due to fuel build-up on the bed support 64.

The one or more blades 150 are capable of fitting over the agitator arm 86, which is preferably constructed from a generally round metal pipe. The agitator arm 86 and the blades 150 are preferably, although not necessarily, constructed from high-temperature stainless steel such as 304 stainless steel plate.

In one embodiment, the blades 150 are integral with the agitator arm 86 and created with one mold. In another embodiment, the blades 150 are separate from the agitator arm 86 and operatively connected thereto, for example by placing one or more connecting members such as bolts or screws through the blades 150 and the agitator arm 86 or by welding the connecting portions of the blades 150 to the agitator arm 86.

Most preferably, a plurality of spaced-apart and angled blades 150 are included around the agitator arm and operatively connected thereto. The blades 150 are preferably spaced approximately two inches apart, but most preferably are spaced approximately 1 15/16 inches apart. Also preferably, 19 blades are spaced across the agitator arm 86 to span approximately 2 feet, 10⅛ inches thereacross. The spacing and span of the blades 150 across the agitator arm described are merely examples and not intended to limit the present invention; rather, it is contemplated for purposes of embodiments of the present invention that any spacing between the blades 150 and any number of blades 150 on the agitator arm 86 may be utilized.

The one or more blades 150 act as deflectors of the ash residue when the agitator arm 86 rotates within the gasification chamber device 28. Referring specifically to FIG. 7, to attain maximum deflection of the ash residue, the blades 150 are preferably disposed at an angle A with respect to a perpendicular line P through a central axis C of the agitator arm 86. The angle A is most preferably approximately 35 degrees, although all angles with respect to the perpendicular line P are contemplated for various embodiments of the present invention.

Referring to FIG. 9, each blade 150 has a width W, length L, and thickness T. The width W is preferably approximately 3⅜ inches, while the thickness is preferably approximately ⅜-inch. In one embodiment, each blade 150 includes a cut-out portion 155, as illustrated in FIGS. 8 and 9. In this embodiment, the cut-out portion 155 of each blade 150 is operatively connected to an outer diameter of the agitator arm 86. The cut-out portion 155 is preferably formed in such a way as to allow disposition of the blades 150 at the angle A relative to the perpendicular line P when the blade 150 is operatively connected to the agitator arm 86.

As schematically depicted in FIG. 8, when the blades 150 are in position on the agitator arm 86, a lowermost portion of the blades 150 is disposed above the refractory plate 80 (for reference, see FIG. 2). Most preferably, the clearance distance between the lowermost portion of the blades 150 and the uppermost portion of the refractory plate 80 is approximately ½-inch. The preferred minimum distance between the lowermost portion of the blades 150 and the uppermost portion of the refractory plate 80 is approximately ¼-inch.

Optionally, one or more temperature-sensing devices may be located on the agitator arm 86 or on the bed support 112 to sense the temperature at or near the agitator arm 86 within the gasification chamber device 28. The temperature-sensing devices are preferably thermocouples, but may include any other temperature-sensing device known to those skilled in the art in lieu of or in addition to thermocouples. The thermocouples are preferably disposed in between the blades 150 to sense the temperature of the fuel disposed below the agitator arm 86. This temperature reading may be transmitted back to the computer 50 from the thermocouples.

When the temperature-sensing devices are included, the computer 50 preferably is programmed to automatically alter and optimize parameters within and around the gasification chamber device 28 according to the temperature reading at the thermocouples, for example by adjusting the feed rate, the rake height, the inflow velocity control, the temperature of the underfire blower 46 and/or overfire blower 44, etc. The fusion temperature (hereinafter "$T_f$") of the fuel disposed below the agitator arm 86 may be calculated by the computer 50 and the fuel may be maintained by the computer 50 optimizing parameters of the gasification chamber device 28 at a temperature below the $T_f$ of that fuel. Maintaining the temperature of the fuel below the agitator arm 86 below its $T_f$ aids in preventing slagging of the fuel, consequently helping to increase efficiency of the gasification process.

Optionally, the agitator arm 86 is rotatable around its central axis C as well as moveable around the inner diameter of the gasification chamber device 28. Rotation of the agitator arm 86 around its central axis C further fluidizes the fuel within the gasification chamber device 28 to urge the fuel towards the outer perimeter of the gasification chamber device 28.

Figure 10:
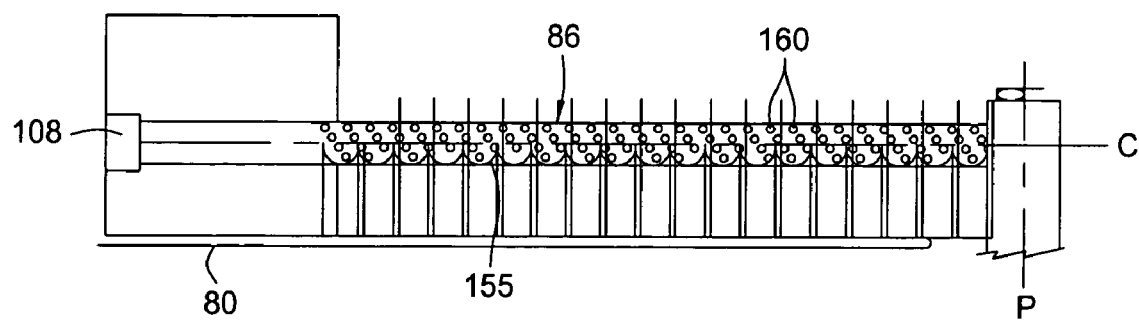
FIG. 10 is a partial section view of an alternate embodiment of an agitator arm usable with the apparatus of FIGS. 1 and 2.

FIG. 10 illustrates an alternate embodiment of the agitator arm 86. In this embodiment, the agitator arm 86 includes one or more perforations 160 therethrough. Although the perforations 160 are shown as round in shape in FIG. 10, it is contemplated that the perforations 160 may be of any shape capable of delivering an amount of the fluid through the agitator arm 86.

These perforations 160, preferably a plurality of spaced-apart perforations through the pipe of the agitator arm 86, are utilized to deliver a fluid through the agitator arm 86 to cool the agitator arm 86. The fluid delivered through the agitator arm 86 is preferably steam, most preferably delivered through the agitator arm 86 at a temperature of approximately 175-200° F. The steam enters the perforations after traveling through a steam delivery passage through the agitator arm 86. Preferably, the source of the steam is located outside the gasification chamber device 28, but it is contemplated that the source may be at any location.

Supplying steam through the agitator arm 160 prevents the agitator arm 86 from operating inefficiently or improperly due to overheating. Without the steam delivery, the agitator arm 86 may bow upward and/or downward relative to the gasification chamber device 28 when overheated. Supplying steam through the agitator arm 160 also promotes cooling of the bed temperatures to prevent slagging and further promotes more efficient conversion of the carbon in the fuel to carbon monoxide.

The thermocouples mentioned above may also be utilized to sense the temperature of the agitator arm 86, and the computer 50 may be configured to selectively signal delivery of steam through the perforations 160 to maintain the desired or optimal temperature of the agitator arm 86. Most preferably, the agitator arm 86 is maintained at a temperature below approximately 300° F. for optimal agitator arm 86 performance (to prevent bending/bowing of the agitator arm 86 within the gasification chamber device 28).

In any of the above embodiments, steam may optionally be injected into the underfire air zones in the plenum chamber. The quantity of the steam injected into each zone may be regulated by zone to advantageously increase the conversion of carbon in the fuel to carbon monoxide and promote cooling of the fuel bed.

In any of the above-described embodiments, additional agitator arms 86 may be added to the gasification chamber device 28. Adding agitator arms 86 to the gasification chamber device 28 allows the speed of travel of the agitator arms 86 to be decreased without sacrificing residence time of the fuel and without causing entrainment of the fuel/ash into the gas stream. Particularly, although not exclusively, olive waste fuel may benefit by increasing the amount of agitator arms 86 disposed around the circumference of the gasification chamber device 28.

Figure 11:
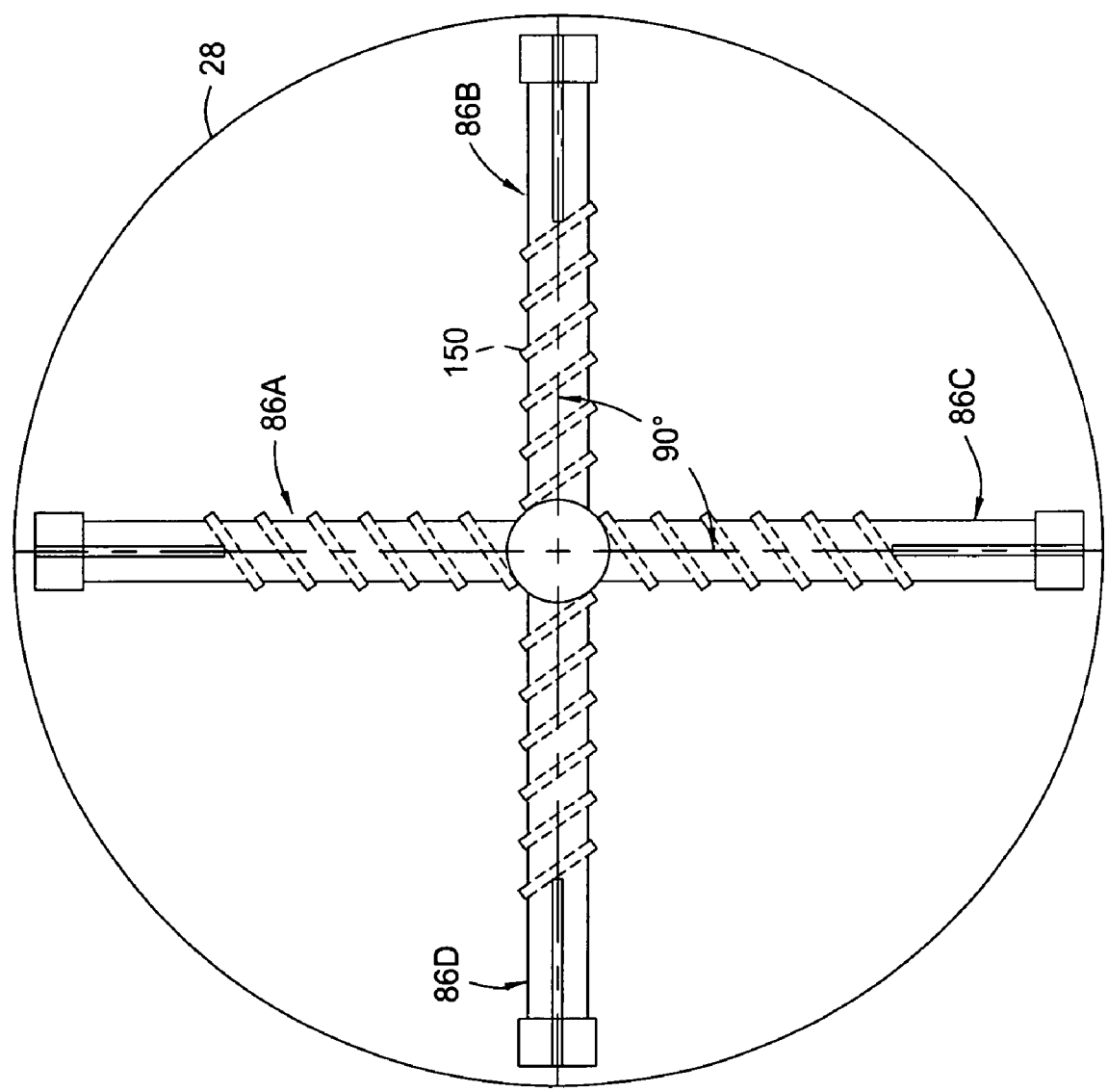
FIG. 11 is a downward view through a cross-section of an alternate embodiment of the apparatus of FIGS. 1-5, showing the agitator arms within the apparatus.

Typically, two agitator arms 86 are utilized with the gasification chamber device 28, one agitator arm disposed approximately 180 degrees from the other agitator arm. In another embodiment, a dual agitator includes four agitator arms 86A, 86B, 86C, and 86D located approximately 90 degrees from one another within the gasification chamber device 28, as shown in FIG. 11. The dual agitator is preferably utilized in a gasification chamber device 28 having a diameter of approximately 24 feet. When the dual agitator is utilized, at least four spaced-apart ash ports 114 are preferably disposed within the bed support 64 to allow proper disposal of the ash residue within the gasification chamber device 28 through the ports 114; however, it is contemplated that any number of ports 114 may be included through the bed support 64.

The dual agitator may optionally include the one or more blades 150 on one or more of the agitator arms 86A-D. Moreover, the dual agitator may optionally include the steam delivery system shown and described in relation to FIG. 10 and/or may optionally include the thermocouples or other heat-sensing devices as described above. It is within the scope of embodiments of the present invention that in lieu of the dual agitator, any number of agitator arms may located at any angle with respect to the other agitator arms and spaced apart at any distance. Although it is preferable that the number of ports 114 equal the number of agitator arms 86 utilized, it is also within the scope of embodiments that any number of ports 114 may be included through the bed support 64.

In any of the embodiments described above, the underfire air flowing through one or more of the radially-spaced inflow zones may be preheated by adding steam to the underfire air. Preheating the underfire air may increase the efficiency of the gasification process. In addition to preheating the underfire air, steam injected into one or more zones of the plenum chamber may increase the efficiency of the gasification process.

Additionally, in any of the above-described embodiments, one or more thermocouples or other heat-sensing devices may be located within one or more of the chambers 84a, 84b below the bed support 64 to determine the temperature below the agitator arm(s) 86. As described above in relation to the optional thermocouples between the blades 150, the thermocouples located within the chambers 84a, 84b may sense temperature at the location(s) and send the signal(s) indicating the temperature at the location(s) to the computer 50. The computer 50 may then send signal(s) to various operations of the apparatus to modify one or more operating parameters to optimize performance of the gasification process. The thermocouple(s) may be utilized to monitor the temperature of the fuel on the bed support 64 to prevent slagging due to the overheating and consequential hardening of the fuel on the bed support 64.

Advantageously, the above embodiments provide an efficient and optimal gasification process by reducing or eliminating slagging of the fuel on the bed within the gasification chamber. Moreover, embodiments described above advantageously provide an efficient and optimal gasification process by controlling the temperature of the bed within the gasification chamber and by controlling the temperature of the agitator arm(s).

The following are examples of biomass fuels which may be utilized with the gasifier: rice hulls, rice straw, chicken litter, green bark, sawdust and chips, peat, wheat straw, corn cobs and stubble, peanut hulls, processed municipal solid waste ("RDF") (fluff, flake, and pellet), petroleum coke, cotton gin waste, cotton seed hulls, low grade coal, green or dry wood waste, agricultural residues, paper mill sludge, wastewater treatment sludge, or a combination of any of the above. The gasifier may use the biomass fuels to produce, for example, one or more of the following: heat for the direct firing of dry kilns, steam to generate electricity for use or sale, steam for use in industrial processes, gas for I/C engine/gensets, gas for co-firing of utility boilers, heat for direct firing of thermal oxidizers, and/or lower waste disposal costs.

In the above description, the biomass may experience combustion or incineration rather than gasification, although biomass gasification is the preferred method of recycling waste products.

While the foregoing is directed to embodiments of the present invention, other and further embodiments of the invention may be devised without departing from the basic scope thereof, and the scope thereof is determined by the claims that follow.

The invention claimed is:

1. A gasification system for gasifying one or more materials, comprising:
   a gasification chamber capable of gasifying the one or more materials to produce one or more products;
   at least one moveable agitator arm located within the gasification chamber for fluidizing the one or more materials during gasification, the agitator arm moveable arcuately through the gasification chamber and wherein the agitator arm comprises a circular cross-section; and
   a plurality of discrete, planar, angled blades spaced radially along the at least one agitator arm wherein each blade circumscribes the at least one agitator arm and comprises a circular cut-out portion at which the blade connects to the at least one agitator arm, wherein the circular cut-out portion is formed in such a way as to allow disposition of the blade at an angle with respect to a central axis through the at least one agitator arm, and wherein each blade other than that one of said blades positioned most radially outward is spaced with respect to a next-adjacent radially outward blade on each agitator arm at such distance that ash within the gasification chamber may be pushed from a position radially aligned with such blade to a position radially aligned with such next-adjacent radially outward blade.

2. The gasification system of claim 1, wherein the one or more blades are disposed at an angle calculated to sufficiently fluidize the one or more materials during gasification, the angle being with respect to a perpendicular line through a central axis through the at least one agitator arm.

3. The gasification system of claim 2, wherein the angle is approximately 35 degrees.

4. The gasification system of claim 1, wherein an upper portion of each blade is disposed further outward from an agitator arm support than a lower portion of each blade.

5. The gasification system of claim 1, wherein the at least one agitator arm is further rotatable around its central axis to cause the one or more blades to further fluidize the one or more materials within the gasification chamber.

6. The gasification system of claim 1, wherein the one or more blades are constructed from at least one metal.

7. The gasification system of claim 1, wherein the at least one agitator arm comprises a plurality of orifices therein capable of delivering steam therethrough, wherein the orifices are spaced along the length of the agitator arm.

8. The gasification system of claim 1, comprising at least three agitator arms.

9. The gasification system of claim 1, further comprising at least one temperature-sensing device proximate to the at least one agitator arm for sensing the temperature of the one or more materials at a location.

10. The gasification system of claim 9, wherein the at least one temperature-sensing device is at least one thermocouple.

11. The gasification system of claim 9, wherein the at least one temperature-sensing device is operatively connected to a computer for monitoring and optimizing parameters within the gasification chamber.

12. A gasification system for gasifying one or more materials, comprising:
a gasification chamber having a fuel supporting bed therein;
at least four agitator arms comprising a circular cross-section and disposed above the fuel-supporting bed for rotatably distributing the one or more materials upon the fuel-supporting bed;
a plurality of discrete, planar angled blades radially spaced along at least one of the at least four agitator arms wherein each blade circumscribes the at least one agitator arm and comprises a circular cut-out portion at which the blade connects to the agitator arm, wherein the cut-out portion of each blade is formed in such a way as to allow disposition of the blade at an angle with respect to a longitudinal axis through the at least one agitator arm, and wherein each blade other than that one of said blades positioned most radially outward is spaced with respect to a next-adjacent radially outward blade on each agitator arm at such distance that ash on the fuel supporting bed may be pushed from a position radially aligned with such blade to a position radially aligned with such next-adjacent radially outward blade; and
at least four spaced-apart ash ports in the fuel-supporting bed for withdrawing the one or more materials therethrough.

13. The gasification system of claim 12, further comprising a plurality of orifices through at least one of the at least four agitator arms for delivering steam for cooling the at least one agitator arm, wherein the orifices are spaced along the length of the at least one agitator arm.

14. The gasification system of claim 12, wherein the one or more blades are angled with respect to a perpendicular line through a central axis of the at least one agitator arm.

15. The gasification system of claim 12, wherein at least one of the agitator arms is rotatable about its central axis.

* * * * *